(12) United States Patent
Jeng

(10) Patent No.: US 6,289,180 B1
(45) Date of Patent: Sep. 11, 2001

(54) PHOTOFLASH CHARGING CIRCUIT WITH CURRENT AND VOLTAGE MONITOR

(75) Inventor: Peter Peide Jeng, Phoenix, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,880

(22) Filed: Dec. 8, 1997

(51) Int. Cl.$^7$ ....................................... G03B 15/05
(52) U.S. Cl. ........................................ 396/206; 396/277
(58) Field of Search ................... 396/206, 277, 396/279, 205, 203; 340/636; 361/79, 86, 87; 320/166, 167; 315/241 P

(56) References Cited

U.S. PATENT DOCUMENTS

| | | | |
|---|---|---|---|
| 3,409,802 | * 11/1968 | Savage | 361/79 |
| 3,810,212 | * 5/1974 | Biber | 396/206 |
| 4,074,170 | 2/1978 | Orban | 315/120 |
| 4,792,762 | * 12/1988 | Shiina et al. | 396/279 X |
| 5,023,470 | 6/1991 | Onozuka et al. | 396/205 X |
| 5,302,889 | 4/1994 | Marsh | 323/284 |
| 5,500,710 | 3/1996 | Saito et al. | 396/277 |
| 5,579,066 | * 11/1996 | Miyamoto et al. | 396/279 |

* cited by examiner

*Primary Examiner*—W. B. Perkey
(74) *Attorney, Agent, or Firm*—Blakely, Sokoloff, Taylor & Zafman LLP

(57) ABSTRACT

A camera that includes a battery, a photoflash circuit, and a charging circuit to provide energy from the battery to the photoflash circuit is provided. The camera further includes a voltage monitor coupled to the battery to switch off the battery from the charging circuit when a voltage on the battery falls below a predetermined voltage value. The camera may also include a current monitor, coupled to the battery, to switch off the battery from the charging circuit when a current generated through the battery exceeds a predetermined current value.

18 Claims, 5 Drawing Sheets

# PHOTOFLASH CHARGING CIRCUIT WITH CURRENT AND VOLTAGE MONITOR

BACKGROUND OF THE INVENTION (1) Field of the Invention

The present invention generally relates to the field of electronic circuits. More specifically, the present invention relates to charging circuits in imaging systems.

(2) Background Information

Cameras that utilize photoflashes typically include a charging circuit that charges a photoflash capacitor included in the camera. The photoflash capacitor stores energy in the form of electrical charge. This energy is later utilized by the photoflash to produce a "flash" when a picture is taken.

Charging circuits are typically powered by a battery that provides the charging circuit's voltage and current needs. While portable film cameras, do not include various electronic circuits that utilize current and voltage from the battery, contemporary cameras include various electronic circuits other than charging circuits, that utilize power from the battery. Such electronic circuits may include microcontrollers, image sensor arrays, etc. To function properly, these electronic circuits require a minimum voltage or current supplied thereto to function properly.

According to one embodiment of a camera with a charging circuit, a battery supplies a current at a certain voltage to a step-up transformer, that is part of the charging circuit. The transformer transforms a voltage of approximately 3 volts (the battery's voltage) to a voltage of 300 volts at which the photoflash capacitor is charged. The photoflash capacitor then provides the energy stored thereon to a trigger circuit that, among other things, contributes to stepping up the voltage on the photoflash (flash tube) to about 4000 volts. This voltage causes ionization of the gas inside the flash tube. When the photoflash is triggered, the discharge of the photoflash capacitor through the ionized flash tube generates a very high current therethrough thereby causing light in the flash tube.

Alkaline batteries have started to be increasingly used in cameras due to their relatively inexpensive cost and widespread use. However, because an alkaline battery has a high output impedance and a low voltage, when the current generated by the battery rises it causes the voltage on the battery to severely drop to levels that are unacceptable to other electronic circuits in the camera. Rises in the battery current are typically caused by the transformer during the charging of the photoflash capacitor. The drop in the voltage on the battery due to the rise in current may cause malfunctions in the other electronic circuits, in the camera, that share the same battery. This problem becomes more critical when the number of batteries utilized is minimized to reduce the weight of the camera. Another problem associated with alkaline batteries is that if an excessive current draws out of these batteries, these batteries may deteriorate, thereby shortening the battery's life.

It is desirable to provide an imaging system such as a camera that may use alkaline batteries or other similar sources of power that do not cause problems to the functioning of other circuits that share the same battery/batteries. It is desirable to provide an imaging system and a method that may detect instances when the voltage of the battery/batteries reaches a certain predetermined voltage value, at which other circuits connected to the battery may malfunction, and that prevent the voltage on the battery/batteries from further dropping below the predetermined value. It is desirable to provide an imaging system and a method that may detect instances when the battery current exceeds a certain predetermined value and that prevent the battery current from further raising.

SUMMARY OF THE INVENTION

In one alternative embodiment, the present invention provides a camera that includes a battery, a photoflash circuit, and a charging circuit to provide energy from the battery to the photoflash circuit. The camera further includes a current monitor coupled to the battery to switch off the battery from the charging circuit when a current through the battery exceeds a predetermined current value.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

The present invention provides a camera that includes a battery, a flash circuit, and a charging circuit to provide energy from the battery to the photoflash circuit. The camera further includes a voltage monitor coupled to the battery to switch off the battery from the charging circuit when a voltage on the battery falls below a predetermined voltage value. The voltage monitor prevents further charging of a photoflash capacitor and therefore further raise in a current generated by the battery when the voltage of the battery reaches the predetermined voltage value. The voltage monitor, thus, prevents the battery's voltage from dropping below the predetermined voltage that otherwise may cause malfunctioning of other electronic circuits that share the battery.

Figure 1:
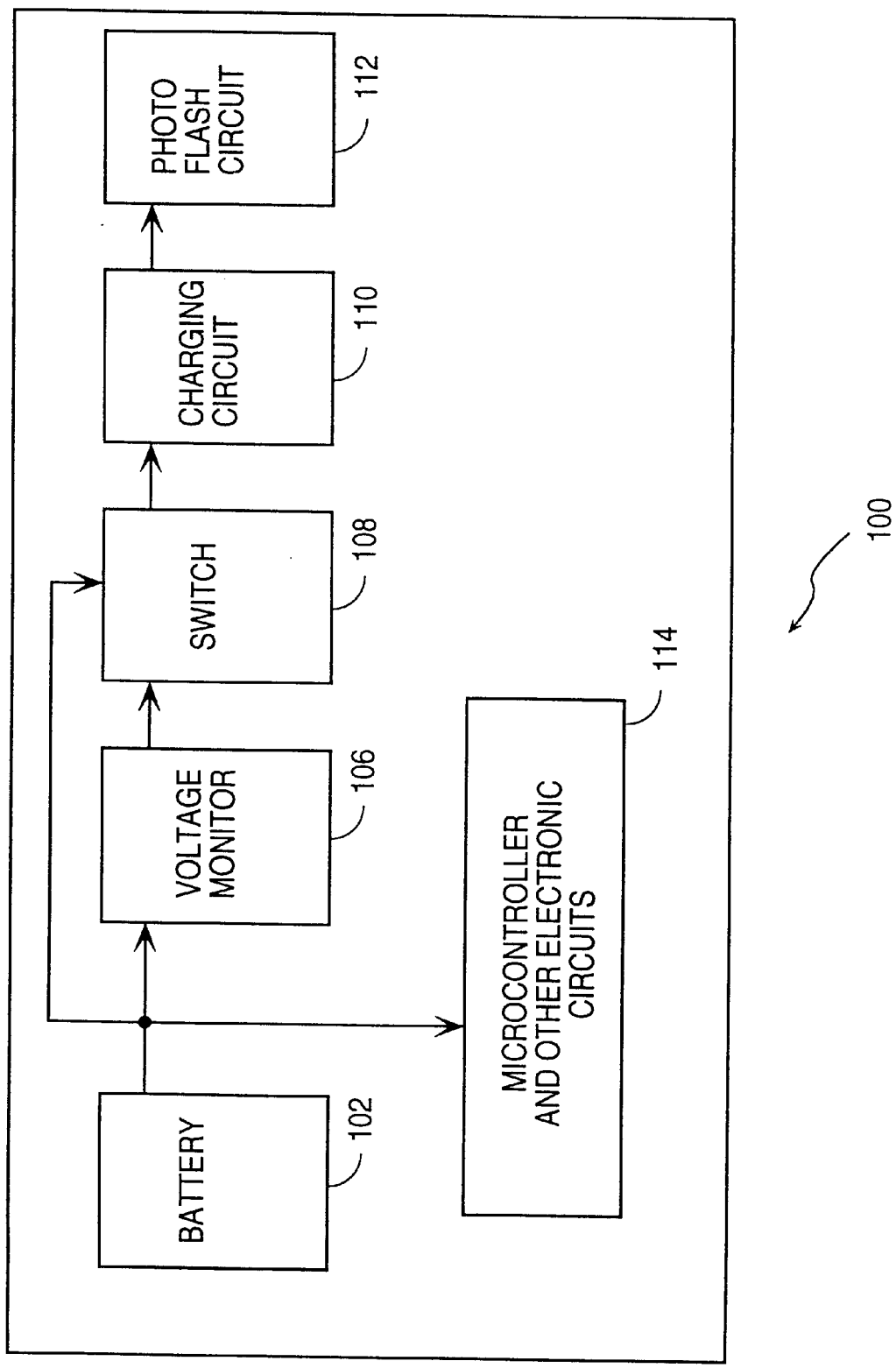
FIG. 1 illustrates a block diagram of a camera with a voltage monitor according to one embodiment of the present invention.

FIG. 1 illustrates a block diagram of one embodiment of a camera 100 according to the present invention. Camera 100 includes a battery (or batteries) 102 which may be an alkaline battery that may output approximately 3 volts. The camera further includes a switch 108 coupled to the voltage monitor 106, a charging circuit 110 coupled to the switch 108, and a flash circuit coupled to the charging circuits. Battery 102 is coupled to a voltage monitor 106 according to the present invention. Voltage monitor 106 insures that when the battery voltage falls below a pre-determined voltage value, the switch 108 prevents further charging by the charging circuit 110 of a photoflash capacitor (not shown) included in charging circuit 110.

Figure 2:
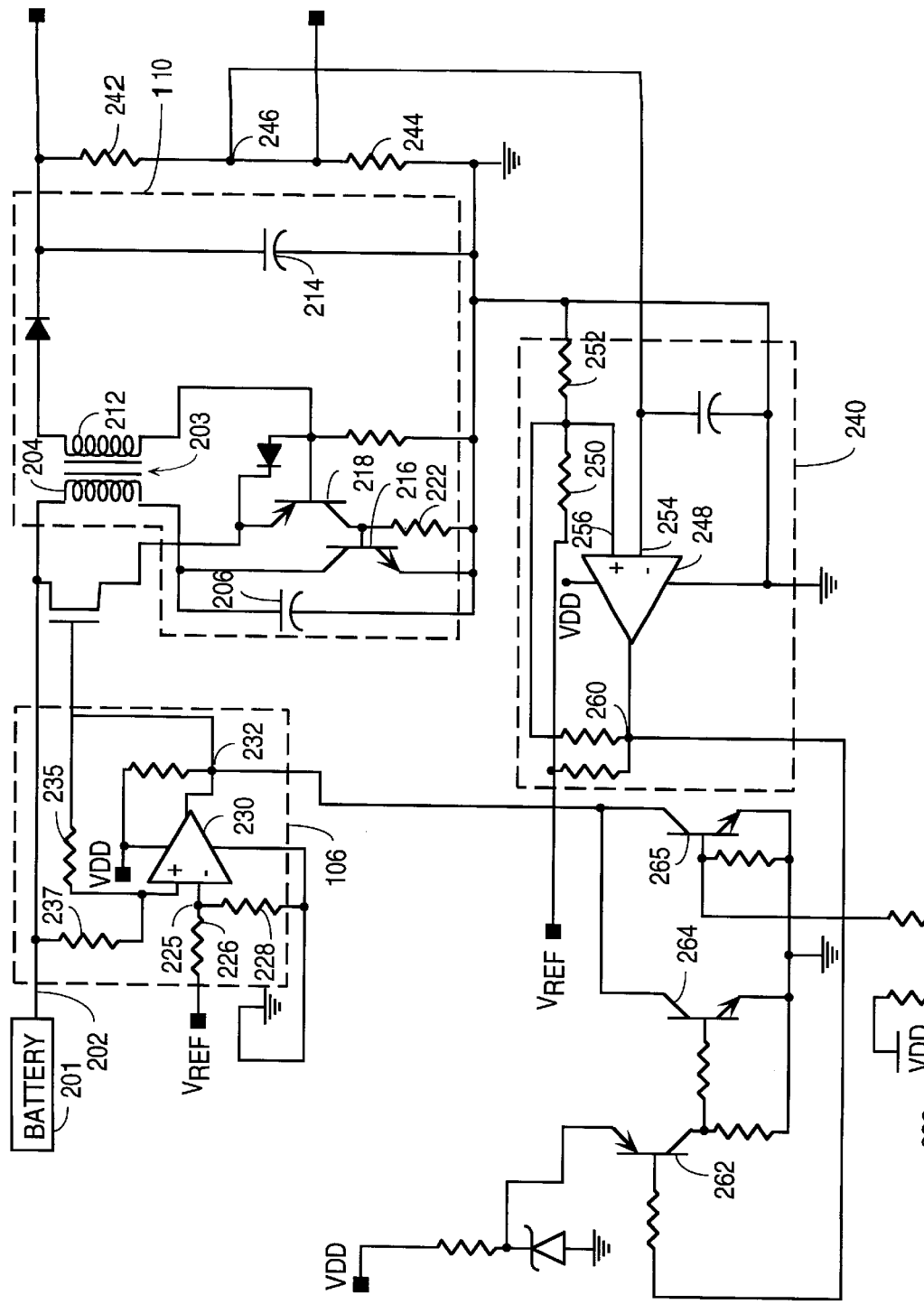
FIG. 2 illustrates a detailed representation of a circuit, in a camera, that includes a voltage monitor according to one embodiment of the present invention.

FIG. 2 illustrates a detailed representation circuit 200 including the voltage monitor 106 and charging circuit 110 according to one embodiment according to the present invention. A Battery 201 provides a voltage $V_{BAT}$ via line 202. The voltage monitor 106 is coupled to a switch device 108 which is implemented, in the embodiment of the circuit according to the present invention described herein, by way of a MOSFET transistor 108. The switch device 108 is coupled to charging circuit 110 and to the battery 201. In one embodiment of the present invention described herein, charging circuit 110 is a self-oscillating circuit that is described in the following discussion.

Charging circuit 110 includes a step-up transformer 203 with a primary 204 coupled at a positive pole thereof to a drain of switch transistor 108. A negative pole of primary 204 is coupled to a capacitor 206. Furthermore, transformer 204 includes a secondary 212 coupled to photoflash capacitor 214. When switch transistor 108 is on, thereby conducting current therethrough, NPN transistor 216 and PNP transistor 218 are ON. The switch transistor 108 conducts current therethrough to the PNP transistor 218 which causes biasing of the base-emitter junction of transistor 216 by virtue of the collector current of transistor 218 that flows through resistor 222. Primary current flows from the primary through transistor 216 to ground. An induced secondary side current flows through transistor 218, the base terminal of transistor 218, the secondary coil 212 of transformer 203, diode D1, thereby charging capacitor 214.

The transformer's primary and secondary current keep increasing at a rate controlled by the inductance of transformer 203 until transformer 203 approaches saturation. When transformer 203 is saturated, the current increase through the primary and the secondary slows down and the polarity of the transformer reverses, turning off transistor 218 as the base of this transistor becomes more positive than the emitter of this transistor. Once transistor 218 is off, transistor 216 is also turned off, as no current flows through transistor 218 and through resistor 222 to bias the base-emitter junction of transistor 216. The current charge of capacitor 214 and the current-charge cycle stops. A new charge cycle starts automatically once the excess energy stored at transformer 203 is absorbed by capacitor 206. Capacitor 206 may have a capacitance of approximately 0.1 Microfarad, resistor 222 may have a resistance of approximately 10.0 Kiloohms, and capacitor 214 may have a capacitance of approximately 250 Microfarad.

Voltage monitor 106 monitors the voltage of the battery 201 to maintain this battery voltage above 1.6 volts during the charging cycle. When the voltage at the battery falls below the predetermined value (approximately 1.6 volts in the embodiment described herein) the voltage monitor switches off the battery from the charging circuit 110. This stops the charge cycle and prevents a raise of the current supplied by the battery thereby preventing a drop in the battery's voltage. The predetermined voltage value is set through a voltage divider formed by resistors 226 and 228. Voltage monitor 106 includes a circuit 230 that determines whether the voltage at the battery is higher or lower than the predetermined voltage value. If the voltage at the battery is lower than the predetermined voltage value, circuit 230 prevents further charging of capacitor 214. In one embodiment of the present invention, circuit 230 is implemented by way of a comparator circuit, but the present invention is not limited to this implementation. Resistor 226 is coupled at one end thereof to a voltage reference $V_{REF}$ that sets, by way of the voltage divider, the predetermined voltage value at one of the inputs (inverting inputs) of comparator circuit 230. In one embodiment of the present invention described herein the comparator may be a LM339 manufactured by National Semiconductor. Once the battery voltage reaches the predetermined voltage value, the output pin (node 232) of the comparator circuit 230 (which is coupled to the gate of MOSFET transistor 108) goes low, turning off the transistor switch 108. When transistor switch 108 is off, the current charge cycle of capacitor 214 is stopped. Resistors 235 and 237 are used to provide hysteresis margin to prevent comparator circuit 230 from oscillating. In one embodiment according to the present invention described herein, resistor 226 has 301 Kiloohms, resistor 228 has 237 Kiloohms, and resistor 232 has 1 Megaohm and resistor 237 has 10 Kiloohms.

The embodiment of the circuit 200 according to the present invention further includes a Strobe on-off control section implemented by way of transistor 265 coupled to node 232. When a control signal PWRMOD6 asserted via line 238 (at the bottom-left part of the figure) is set to zero logic, transistor 265 is turned off and the charging circuit is operated as discussed above. However, when a logic high voltage (3.3 volts) is asserted via line 238, transistor 265 is turned on pulling the gate of transistor switch 108 to ground thereby stopping charging of capacitor 214 by circuit 110.

Circuit 200 further includes a voltage feedback section 240 (shown in dotted lines). A voltage divider coupled in parallel with photoflash capacitor 214 including resistors 242 and 244 scales the photoflash capacitor voltage down. Its scaling ratio is 245 to 1. Node 246 is fed back to a comparator circuit 248 that may be part of the same integrated circuit (LM339) that includes comparator 230. Resistors 250 and 252 provide a hysteresis value that represents 260 and 280 volts of photoflash capacitor voltage respectively. When the charging voltage (on capacitor 214) is higher than 280 volts, the voltage level at input pin 254 is higher than the voltage at input pin 256 which is set to a predetermined value. This causes the output (node 260) of the comparator circuit 248 to go low. When node 260 goes low, transistors 262 and 264 both turn on, and transistor 264 pulls node 232 to ground, thereby preventing charging circuit 110 from further charging capacitor 214. After the charging stops, the voltage of photoflash capacitor 214 will no longer increase and be depleting out slowly through the feedback resistors 242 and 246 and internal leakage.

If the photoflash command is not triggered during this depleting cycle, eventually the voltage of the photoflash capacitor will drop below 260 volts and the voltage at pin 254 of comparator 248 will be lower than the voltage at pin 256 such that the node 260 of the comparator 248 will go high such that transistors 262 and 264 will not be conducing, thereby allowing the charging circuit 110 to charge the capacitor 214. This on/off cycle will maintain photoflash capacitor's voltage between 260 and 280 volts. Unless either of the photoflash commands is issued or a strobe is turned off by the system controller, the on/off cycle continues in this way.

Figure 3:
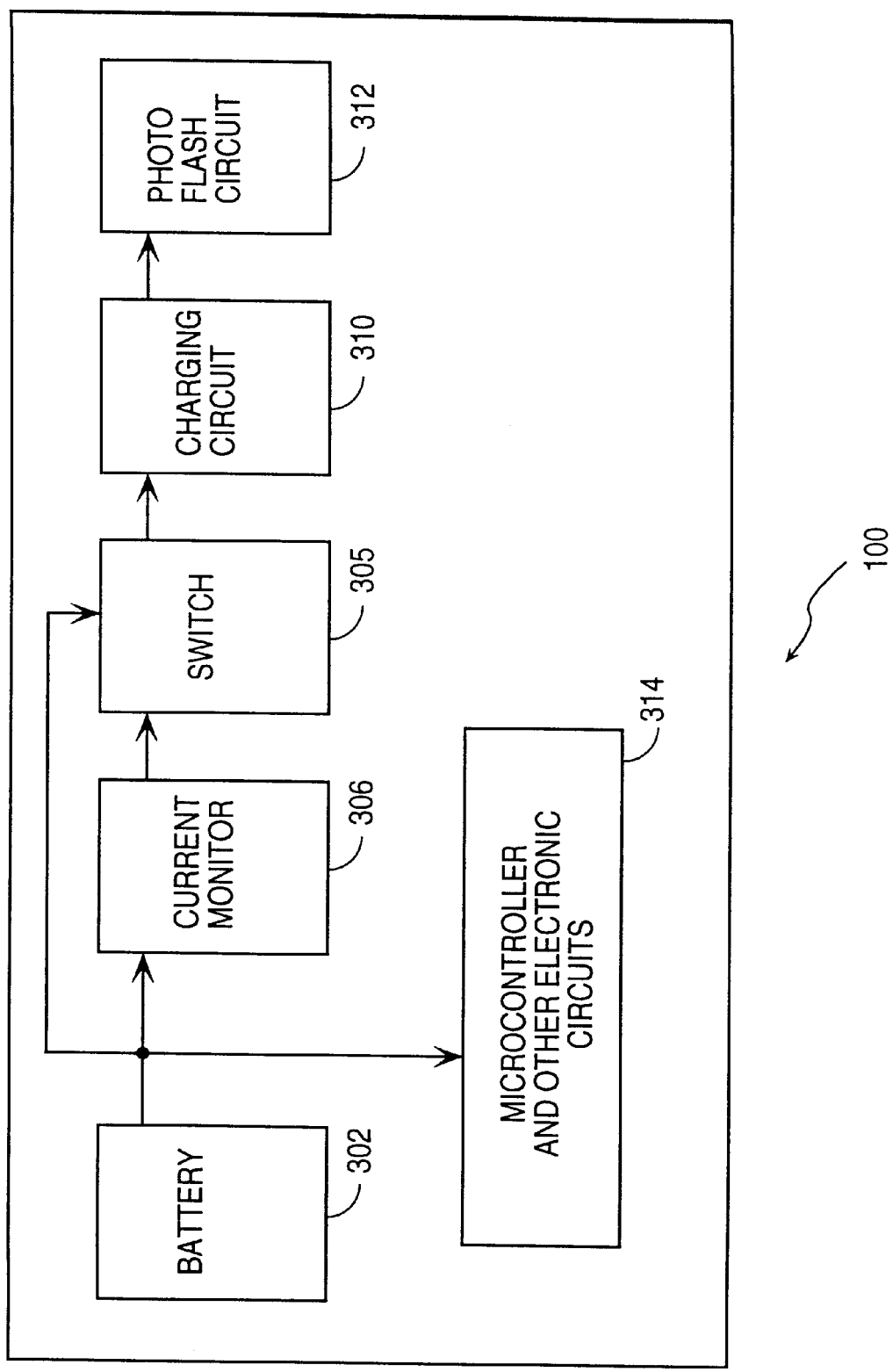
FIG. 3 illustrates a block diagram of a camera with a current monitor according to one embodiment of the present invention.

An alternative embodiment of the circuit according to the present invention utilizes a current monitor 306 as shown in FIG. 3, which detects the level of current that flows from battery 302 to the charging circuit 310. When current from battery 302 exceeds a predetermined value, the current monitor 306 switches OFF the current to charging circuit 310.

Figure 4:
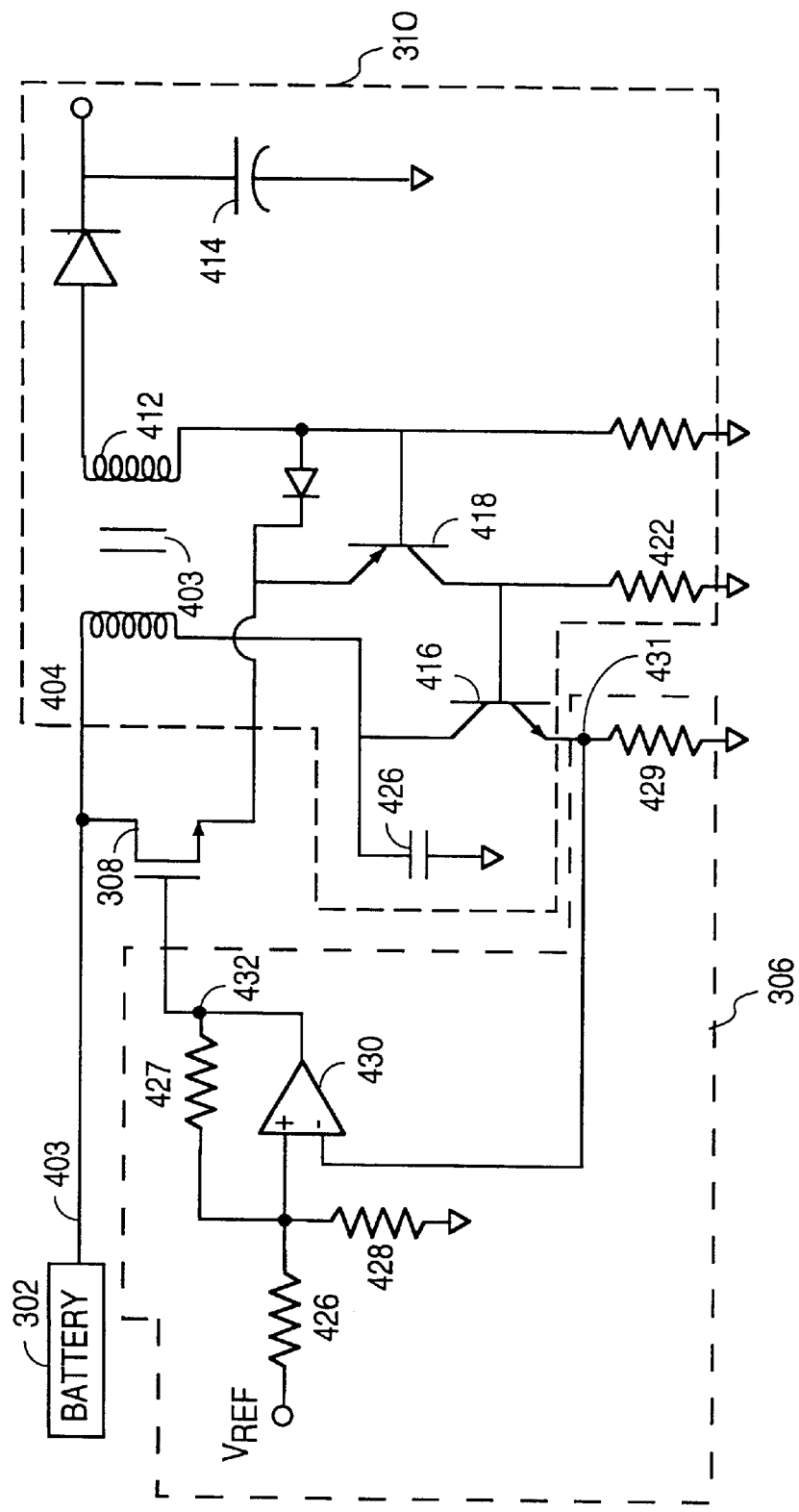
FIG. 4 illustrates a detailed representation of a circuit, in a camera, that includes a current monitor according to one embodiment of the present invention.

FIG. 4 illustrates a detailed representation of a circuit including a current monitor 306 according to one embodiment of the present invention. A battery 302 provides via line 403 a voltage $V_{BAT}$ to a charging circuit 310 (shown in dotted line) and to a switch transistor 308. The charging circuit 310 has the same configuration as the charging circuit 110 described and illustrated in connection with the embodiment of FIG. 2. The explanation of the operation of the charging circuit provided in the foregoing equally applies to the charging circuit 410 of FIG. 4.

Circuit 400 further includes a current monitor 306 that monitors the current of the battery 301 to prevent the current of this battery to raise above a predetermined current value during the charging cycle. When the battery current reaches the predetermined current value (approximately 2 Amperes in the embodiment described herein), the current monitor 306 turns off the switch transistor 308, thereby switching off the battery current from charging circuit 310. This stops the charge cycle and prevents further raise of the current supplied by the battery 302. A predetermined voltage value (corresponding to the predetermined current value) is set through a voltage divider formed by resistors 426 and 428. Resistor 426 is coupled at one end thereof to a voltage reference $V_{REF}$ that sets, by way of the voltage divider, the predetermined voltage value at one of the inputs (inverting inputs) of comparator circuit 430. During the charging, the battery current flows via the primary 404, transistor 416, and resistor 429. Resistor 429, included in current monitor 306, senses the battery current flowing therethrough and converts this current into a voltage at node 431. Since the voltage at node 431 is substantially proportional to the battery current, this voltage reflects the measure of the battery such that there is a voltage value (predetermined voltage value) that corresponds to this predetermined current value. Once the current that flows across resistor 429 exceeds the predetermined current value, the voltage at the inverting input of comparator 430 (same as the voltage across resistor 429) exceeds the voltage generated by the voltage divider 426 and 428 such that the output of comparator 430 (node 432) goes low, thereby turning off switch 308. When transistor switch 308 is off, the current charge cycle is stopped, and the increase in the battery current is stopped too. Resistor 427 is used for providing a hysteresis margin to prevent comparator from oscillating. The embodiment of the circuit 400 further may include the strobe on-off control section discussed in connection with FIG. 2 and the voltage feedback section also discussed in connection with FIG. 2.

Figure 5:
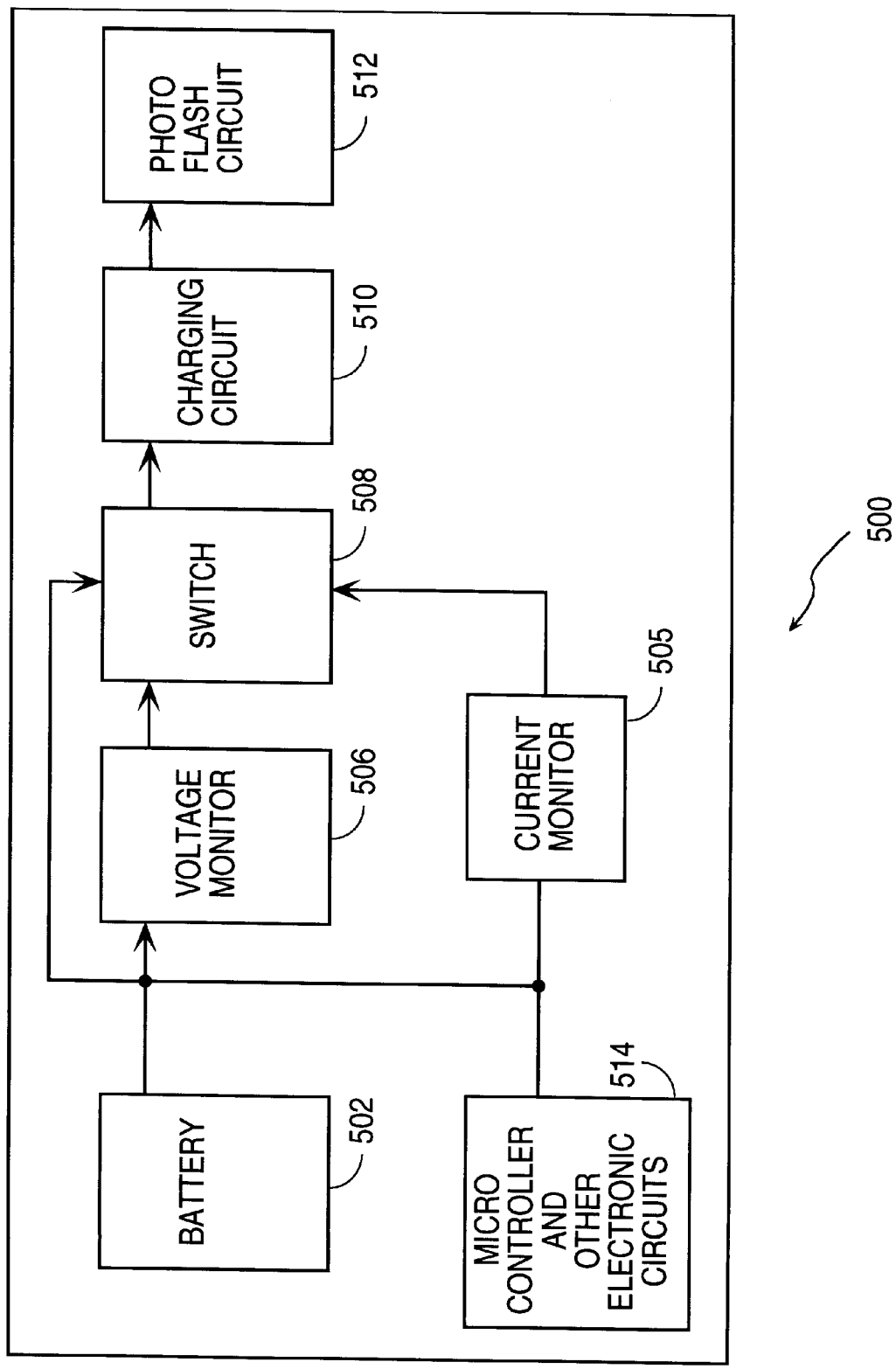
FIG. 5 illustrates a block diagram of a camera with both a voltage monitor and a current monitor according to one embodiment of the present invention.

FIG. 5 illustrates a block diagram of a camera with both a voltage monitor 506 and a current monitor 505 according to one embodiment of the present invention.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A camera comprising:

a battery;

a photoflash circuit;

a charging circuit to provide energy from said battery to said photoflash circuit;

a switch coupled between said charging circuit and said battery to provide energy to said charging circuit;

a current monitor coupled to said battery and said switch, to switch off said battery from said charging circuit when a current through said charging circuit exceeds a predetermined current value, wherein said battery remains available to provide energy to a microcontroller and other circuits of said camera monitor including a hysteresis margin to prevent oscillation from occurring in said current monitor;

a strobe control section coupled to said current monitor, said strobe control section to transmit a control signal to said current monitor; and a voltage feedback section coupled to said charging circuit, said voltage feedback section including a hysteresis margin to maintain a voltage in said photoflash circuit.

2. The camera of claim 1, said current monitor includes a resistor through which current from said battery is sensed.

3. The camera of claim 2, said current monitor includes a circuit to determine when the current generated through the battery exceeds a predetermined current value.

4. The camera of claim 3, said circuit to determine when the current generated through the battery exceeds a predetermined current value has a first input thereof coupled to said resistor, a second input thereof coupled to a reference voltage, and an output thereof coupled to said switch.

5. The camera of claim 1, said charging circuit includes a photoflash capacitor.

6. In a camera, a method of monitoring a current through a battery coupled to a charging circuit, the method comprising:

determining whether a current through said charging circuit exceeds a predetermined current value;

comparing a first voltage to a second voltage;

providing a hysteresis margin to prevent oscillation of said comparing;

receiving a signal to control a strobe;

feeding back a third voltage from said charging circuit; and switching off the battery from the charging circuit if the current through the charging circuit exceeds said predetermined current value, wherein said battery remains available to provide energy to other circuits of said camera.

7. The method of claim 6, further comprising:

determining whether a current through said battery falls below a predetermined current value; and if the current through the battery falls below said predetermined current value, switching on the battery to the charging circuit.

8. The method in claim 7, wherein said predetermined current value is set by a corresponding predetermined voltage value, said predetermined voltage value set by a voltage divider.

9. A camera comprising:

a battery;

a photoflash circuit;

a charging circuit to provide energy from said battery to said photoflash circuit;

a switch coupled between said battery and said charging circuit to provide energy to said charging circuit;

a voltage monitor, coupled to said battery and said switch, to switch off said battery from said charging circuit when a voltage on said battery falls below a predetermined voltage value; and a current monitor, coupled to said battery and said switch, to switch off said battery from said charging circuit when a current through said charging circuit exceeds a predetermined current value, said voltage monitor including a hysteresis margin to prevent oscillation from occurring in said voltage monitor;

a strobe control section coupled to said voltage monitor, said strobe control section to transmit a control signal to said current monitor; and a voltage feedback section coupled to said charging circuit, said voltage feedback section including a hysteresis margin to maintain a voltage in said photoflash circuit; and wherein upon said battery being switched off from said charging circuit, said battery remains available to provide energy to other circuits of said camera.

10. The camera of claim 9 further comprising a switch coupled to the voltage monitor, to the current monitor, and to the charging circuit.

11. The camera of claim 10, the voltage monitor includes a circuit to determine when said voltage on said battery falls below a predetermined voltage value.

12. The camera of claim 10, the current monitor includes a circuit to determine when said current through said battery exceeds a predetermined current value.

13. The camera of claim 11, said circuit to determine when said voltage on said battery falls below a predetermined voltage value, has a first input thereof coupled to said battery, a second input thereof coupled to a reference voltage, and an output thereof coupled to said switch.

14. The camera of claim 13, said circuit to determine when the current generated through the battery exceeds a predetermined current value has a first input thereof coupled to said resistor, a second input thereof coupled to a reference voltage, and an output thereof coupled to said switch.

15. A camera comprising:

a battery;

a photoflash circuit;

a charging circuit to provide energy from said battery to said photoflash circuit;

a switch coupled between said battery and said charging circuit to provide energy to said charging circuit;

a voltage monitor, coupled to said battery and said switch, to switch off said battery from said charging circuit when a voltage on said battery falls below a predetermined voltage value;

a current monitor, coupled to said battery and said switch, to switch off said battery from said charging circuit when a current through said charging circuit exceeds a predetermined current value, said current monitor including a hysteresis margin to prevent oscillation from occurring in said current monitor;

a strobe control section coupled to one of said current monitor and said voltage monitor, said strobe control section to transmit a control signal to one of said current monitor and said voltage monitor; and a voltage feedback section coupled to said charging circuit, said voltage feedback section including a hysteresis margin to maintain a voltage in said photoflash circuit; and a microcontroller coupled to said voltage monitor, wherein upon said battery being switched off from said charging circuit, said battery remains available to provide energy to said microcontroller and other circuits of said camera.

16. The camera of claim 15, said voltage monitor includes a circuit to determine when said voltage on said battery falls below a predetermined voltage value.

17. The camera of claim 16, said circuit to determine when said voltage on said battery falls below a predetermined voltage value, has a first input thereof coupled to said battery, a second input thereof coupled to a reference voltage, and an output thereof coupled to said switch.

18. The camera of claim 14, said charging circuit includes a photoflash capacitor.

* * * * *

UNITED STATES PATENT AND TRADEMARK OFFICE
CERTIFICATE OF CORRECTION

PATENT NO. : 6,289,180 B1
DATED : September 11, 2001
INVENTOR(S) : Jeng

It is certified that error appears in the above-identified patent and that said Letters Patent is hereby corrected as shown below:

Column 2,
Line 7, delete "alternative" before "embodiment".

Signed and Sealed this

Third Day of September, 2002

*Attest:*

*Attesting Officer*

JAMES E. ROGAN
*Director of the United States Patent and Trademark Office*